(12) United States Patent
Kuno et al.

(10) Patent No.: US 7,054,859 B2
(45) Date of Patent: May 30, 2006

(54) APPARATUS AND METHOD FOR RESPONDING TO SEARCH REQUESTS FOR STORED DOCUMENTS

(75) Inventors: Harumi A. Kuno, Cupertino, CA (US); Daniel A. Muntz, Cupertino, CA (US); William K. Wilkinson, Sunnyvale, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 464 days.

(21) Appl. No.: 10/171,001

(22) Filed: Jun. 13, 2002

(65) Prior Publication Data

US 2003/0233344 A1 Dec. 18, 2003

(51) Int. Cl.
*G06F 7/00* (2006.01)
*G06F 17/30* (2006.01)

(52) U.S. Cl. ................... 707/5; 707/3; 707/4
(58) Field of Classification Search ............ 707/3, 707/5
See application file for complete search history.

(56) References Cited

U.S. PATENT DOCUMENTS

| | | | |
|---|---|---|---|
| 5,752,021 A * | 5/1998 | Nakatsuyama et al. ......... 707/5 |
| 5,778,367 A | 7/1998 | Wesinger et al. |
| 5,806,061 A * | 9/1998 | Chaudhuri et al. ............ 707/3 |
| 5,848,415 A * | 12/1998 | Guck ........................ 707/10 |
| 5,873,080 A * | 2/1999 | Coden et al. .................. 707/3 |
| 5,999,664 A * | 12/1999 | Mahoney et al. ........... 382/305 |
| 6,182,063 B1 | 1/2001 | Woods |
| 6,189,002 B1 | 2/2001 | Roitblat |
| 6,263,332 B1 | 7/2001 | Nasr et al. |
| 6,311,194 B1 * | 10/2001 | Sheth et al. ................ 715/505 |
| 6,363,174 B1 | 3/2002 | Lu |
| 7,003,506 B1 * | 2/2006 | Fisk et al. ..................... 707/1 |

OTHER PUBLICATIONS

TopXML Homepage "http://www.vbxml.com/xpl"; 5 pages, printed May 31, 2002.
Xyleme Homepage "http://www.xyleme.com"; 1 page, printed May 31, 2002.
XML Global Homepage "http://www.goxml.com" or "http://www.xmlglobal.com/index.jsp"; 1 page, printed May 31, 2002.
Niagara Internet Query System Homepage "http://cs.wisc.edu/niagara"; 3 pages, printed May 31, 2002.

* cited by examiner

*Primary Examiner*—Uyen Le
*Assistant Examiner*—Cheryl M Shechtman

(57) ABSTRACT

A method for responding to search requests for stored documents. Each of the stored documents includes metadata, content, and a document type identifier for identifying a type of the document. A search request including document type criteria, metadata criteria, and content criteria, is received. A first set of documents based on the metadata criteria is identified. Documents in the first set that have a document type identifier that matches the document type criteria are identified. A search method is identified from a plurality of search methods for searching the content of the identified documents in the first set based on the document type identifier of the documents. The content of the identified documents in the first set is searched using the identified search method and the content criteria.

34 Claims, 5 Drawing Sheets

APPARATUS AND METHOD FOR RESPONDING TO SEARCH REQUESTS FOR STORED DOCUMENTS

THE FIELD OF THE INVENTION

The present invention relates to document retrieval systems, and more particularly, relates to an apparatus and method for responding to search requests for stored documents.

BACKGROUND OF THE INVENTION

The number of documents contained in computer-based information retrieval systems is growing at tremendous rates. Networks bring together large collections of documents, and the increased amount of data makes the retrieval process more difficult. The development of efficient and effective document retrieval techniques is critical to managing the increasing amount of documents available in electronic form.

A complicating factor in many information retrieval systems is that many documents are just different representations of the same content (e.g., a Microsoft Word document can be formatted as PDF, as plain text, as HTML, etc.). Or, the same data could be stored in an Oracle database or in Excel. An article could be stored in English and French.

Another complicating factor occurs when documents are revised. A storage system may have several versions of the same document. Also, documents are componentized, and the same paragraph, slide, or figure may appear in multiple documents. Another factor is that some documents need not be stored. Instead, such virtual documents can be generated upon demand by programs.

A primary issue in the retrieval of electronic documents is filtering the vast amount of information available so that a user can obtain information of interest to the user in a fast and efficient manner, and receive such information in an acceptable format. To assist in searching information available on the Internet, a number of search techniques have been devised to find information requested by the user.

Systems for storing and querying XML data have been implemented. For example, goxml.com facilitates the search of XML data stores, and includes the ability to perform transformations on result documents. However, goxml.com does not support the concept of metadata, nor does it support any chaining of transformations. Other systems, such as xyleme.com, support the searching of XML data on the web, but do not support either transformations or metadata. In addition to these systems for storing and querying XML data, there are many other systems for storing and querying electronic documents in a variety of formats. None of the existing systems appear to integrate transformation and querying capabilities for both metadata and content, nor do they support the creation of transformation plans.

It would be desirable for a system to integrate transformation and querying capabilities for both metadata and content, and to support the creation of transformation plans. It would also be desirable for a system to take both search and transformation costs into account when creating a transformation plan.

SUMMARY OF THE INVENTION

One form of the present invention provides a method for responding to search requests for stored documents. Each of the stored documents includes metadata, content, and a document type identifier for identifying a type of the document. A search request including document type criteria, metadata criteria, and content criteria, is received. A first set of documents based on the metadata criteria is identified. Documents in the first set that have a document type identifier that matches the document type criteria are identified. A search method is identified from a plurality of search methods for searching the content of the identified documents in the first set based on the document type identifier of the documents. The content of the identified documents in the first set is searched using the identified search method and the content criteria.

DESCRIPTION OF THE PREFERRED EMBODIMENTS

In the following detailed description of the preferred embodiments, reference is made to the accompanying drawings that form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

One embodiment of the present invention provides a system and method for retrieving semi-structured, "typed" documents (i.e., each document is assigned a particular type or category). The documents are also referred to as document instances. Document transforms are provided for turning document instances of one type into document instances of another type. In one form of the invention, in the event that a search request finds no documents of the desired type, transforms are applied to create a new document that meets the search criteria. In one embodiment, the system takes into account both the search costs and the transformation costs in order to develop an optimized plan (e.g., least-cost, least-time plan) for retrieving documents.

As described above in the Background of the Invention, complicating factors occur in many information retrieval systems because many documents are just different representations or versions of the same content, documents are componentized, and some documents may be virtual documents that are generated on demand. In one form of the invention, these different formats/representations, versions/components and virtual documents are modeled as transformations on the documents.

Figure 1:
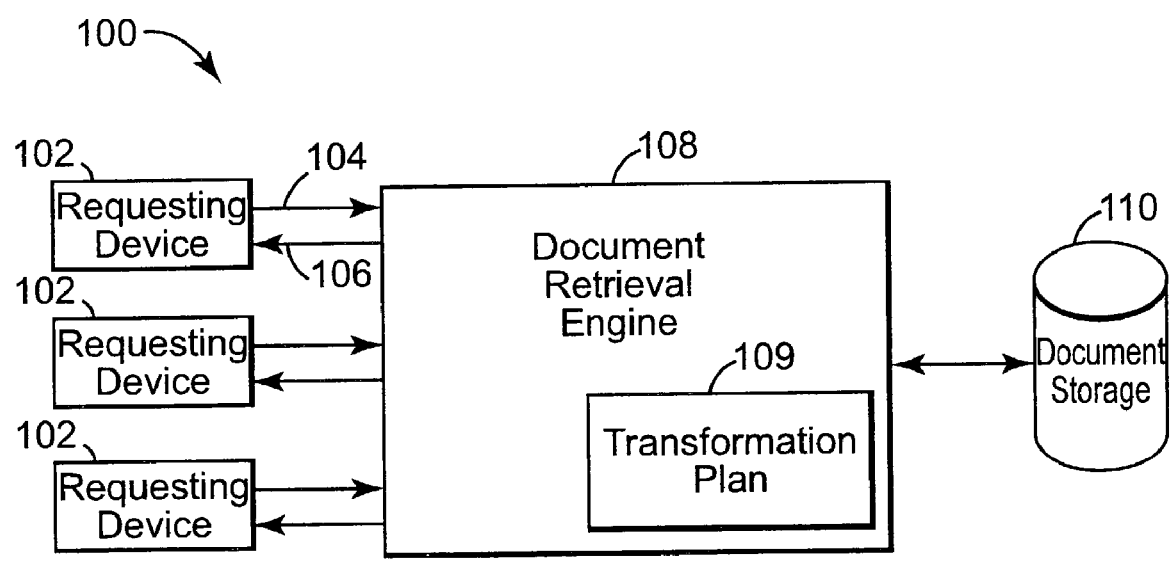
FIG. 1 is a high-level block diagram illustrating major components of a document retrieval system according to one embodiment of the present invention.

FIG. 1 is a high-level block diagram illustrating major components of a document retrieval system 100 according to one embodiment of the present invention. Document retrieval system 100 includes a plurality of requesting devices 102, a document retrieval engine 108, and document storage 110. In one embodiment, document retrieval system 100 is implemented in a networked client-server configuration, with requesting devices 102 implemented as client devices, and document retrieval engine 108 implemented as a server device. In one form of the invention, document retrieval system 100 is coupled to the Internet and/or one or more intranets.

Requesting devices 102 send search expressions (queries) 104 to document retrieval engine 108. Document retrieval engine 108 is configured to retrieve documents from document storage 110 and/or document identification information based on received search expressions 104. In one form of the invention, document retrieval engine 108 creates a transformation plan 109, which takes into account search costs and transformation costs, and represents an optimized plan for retrieving documents. In one embodiment, document storage 110 is implemented as a single device, such as a single computer in a networked configuration. In an alternative embodiment, document storage 110 is part of a distributed system with multiple devices or platforms storing documents. Document retrieval engine 108 provides results 106 of a search to the appropriate requesting device 102. In one embodiment, the returned results 106 include hyperlinks to matching documents found in the search, and/or include other identifying information.

Figure 2:
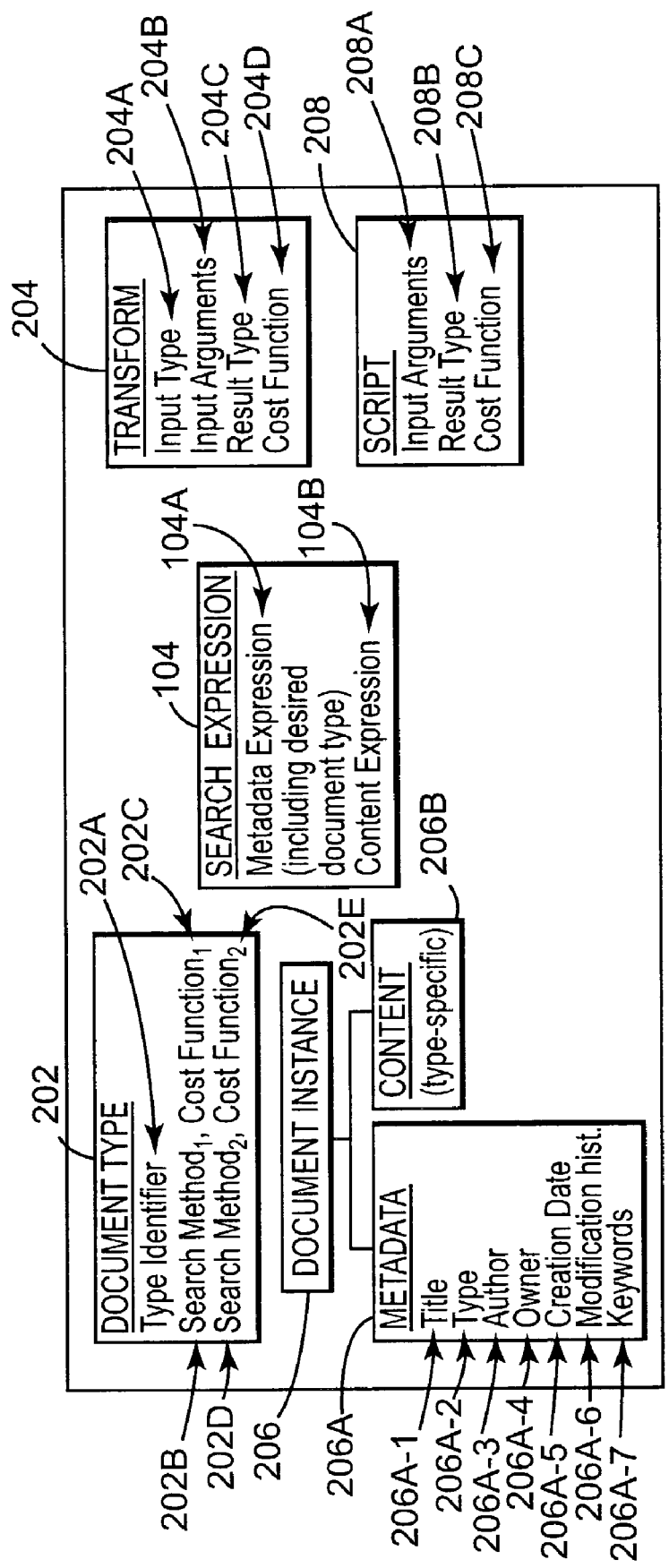
FIG. 2 is a diagram illustrating software-based objects used by the document retrieval system according to one embodiment of the present invention.

FIG. 2 is a diagram illustrating software-based objects used by document retrieval system 100 according to one embodiment of the present invention. The objects include a document type object 202, a search expression object 104, a transform object 204, and a script object 208. FIG. 2 also illustrates a document instance 206. A plurality of document instances 206 are stored in document storage 110. Each document instance 206 is associated with a document type object 202, which identifies the type of the document instance 206. The set of document types is extensible in one form of the invention.

Document instances 206 include metadata 206A and content 206B. In one embodiment, the format and structure of the document content 206B for a document instance 206 is determined by the document type 202 for that document instance 206. In one embodiment, the metadata 206A for a document instance 206 describes the content 206B of the instance 206, and includes additional data including document title 206A-1, document type 206A-2, author 206A-3, owner 206A-4, creation date 206A-5, modification history 206A-6, and search keywords 206A-7. In alternative embodiments, other types of metadata 206A are used. Metadata 206A is extensible, and the metadata 206A is expressed as a semi-structured document in one form of the invention.

Document type objects 202 include a document type identifier 202A, and one or more search methods, with each search method having an associated cost function. For each document type, there are associated search methods. As shown in FIG. 2, document type object 202 includes a first search method 202B with an associated cost function 202C, and also includes a second search method 202D with an associated cost function 202E. Each search method (e.g., 202B or 202D) for a particular document type 202 defines a method of searching the content 206B of a document instance 206 of that type 202. Associated with each search method is a cost function (e.g., 202C or 202E) that estimates the "cost" of searching a document with a given search expression 104. In one embodiment, the term "cost" as used herein represents a set of metrics that includes estimates of system resources, such as memory requirements, central processing consumed, number of I/O operations required, as well as other estimates. These are example cost factors used in one embodiment of the present invention. Alternative embodiments use additional and/or different cost factors. In one form of the invention, each cost function (e.g., 202C or 202E) takes into consideration the search expression 104, document sizes, the static and/or dynamic system state, as well as other factors.

In one embodiment, each search expression 104 includes a metadata expression 104A and a content expression 104B. The metadata expression 104A provides criteria regarding the metadata 206A of document instances 206, and the content expression 104B provides criteria regarding the content 206B of document instances 206. In one form of the invention, the metadata expression 104A also specifies the desired result document type or types 202 for a search. As mentioned above, the format of the content 206B is type-specific in one embodiment, so each document type 202 includes search methods (e.g., 202B and 202D) that are invoked to apply the content criteria in content expression 104B to document instances 206 of that type 202. For example, a search expression 104 intended to describe an XML document might contain an xpath expression and would require a method capable of parsing xpath expressions and querying XML documents. Furthermore, if an XML document type (e.g., a dtd or an xml schema) were specified for the XML document, then a search method could be tailored to that particular XML schema. Searching a Microsoft Word document would require different expressions and a corresponding method or methods.

A search expression 104 can be expressed as a pair <M, C>, where M is an arbitrary metadata expression 104A over document metadata 206A, and C is an arbitrary content expression 104B over document content 206B.

Since a given document type 202 may have multiple search methods (e.g., 202B and 202D) that could be used to search instances 206 of that type 202, in one form of the invention, the cost function (e.g., 202C or 202E) of each search method is invoked by retrieval engine 108 to estimate the cost of applying the search method for a given search expression 104. In one embodiment, the relative rankings of the costs are then used by retrieval engine 108 to select a search method to use to actually perform the search.

Transform object 204 includes input type 204A, input arguments 204B, result type 204C, and cost function 204D. Instances of transform object 204 are documents that represent operators for converting an instance 206 of one document type 202 (i.e., a source document) into an instance 206 of another document type 202 (i.e., a goal document). The input type 204A of a transform 204 identifies the document type 202 for a source document to be transformed, and the result type 204C identifies the document type 202 for the goal document. In one embodiment, transforms 204 include one or more arguments or parameters 204B, such as the metadata 206A associated with the source document and metadata describing the goal document. Each transformation 204 has an associated cost function 204D that is itself parameterized in one form of the invention. The cost function 204D for a given transform 204 represents the "cost" of applying the transformation, where "cost" is again a set of metrics, such as those described above. In one embodiment, transforms 204 translate both the document content 206B of a document instance 206, as well as the associated metadata 206A.

In addition to transforming document instances 206 from one type to another type, transforms 204 are also used to transform search expressions 104, such as converting <Mi, Ci>into <Mj, Cj>. Each search expression transformation also has associated costs, and, as with search methods, these costs are estimated by retrieval engine 108 using associated cost functions 204D.

Script object 208 includes input arguments 208A, result type 208B, and cost function 208C. Instances of script 208 are documents that are executed to create new documents of a specific type. Scripts 208 may be thought of as transforms from the null type to a specific type. Scripts 208 include arguments or parameters 208A that provide information regarding the desired document to be created. Result type 208B identifies the document type 202 for the goal document 206 (i.e., the new document to be generated).

In one embodiment, both transformations 204 and scripts 208 are typed documents 206 that are described using metadata 206A, and are retrieved from document storage 110 by retrieval engine 108. It is not necessary in one form of the invention to store metadata 206A and transformations 204 with the document content 206B. In one embodiment, one document store contains only document content 206B, such as in a file system or on the Internet. And a separate document store contains metadata 206A and transformations 204. Techniques for maintaining consistency between such separate document stores are known to those of ordinary skill in the art.

In one form of the invention, transformations 204 are applied to scripts 208 to produce new scripts 208 that produce documents 206 of a different type 202 than documents 206 produced by the original scripts 208. For example, if a script 208 exists that can produce a document of type A, and a transformation 204 exists that can convert scripts 208 that can produce documents 206 of type A into scripts 208 that can produce documents 206 of type B, then the transformation 204 can be applied to the script 208 to produce a new script that generates documents 206 of type B.

Figure 3:
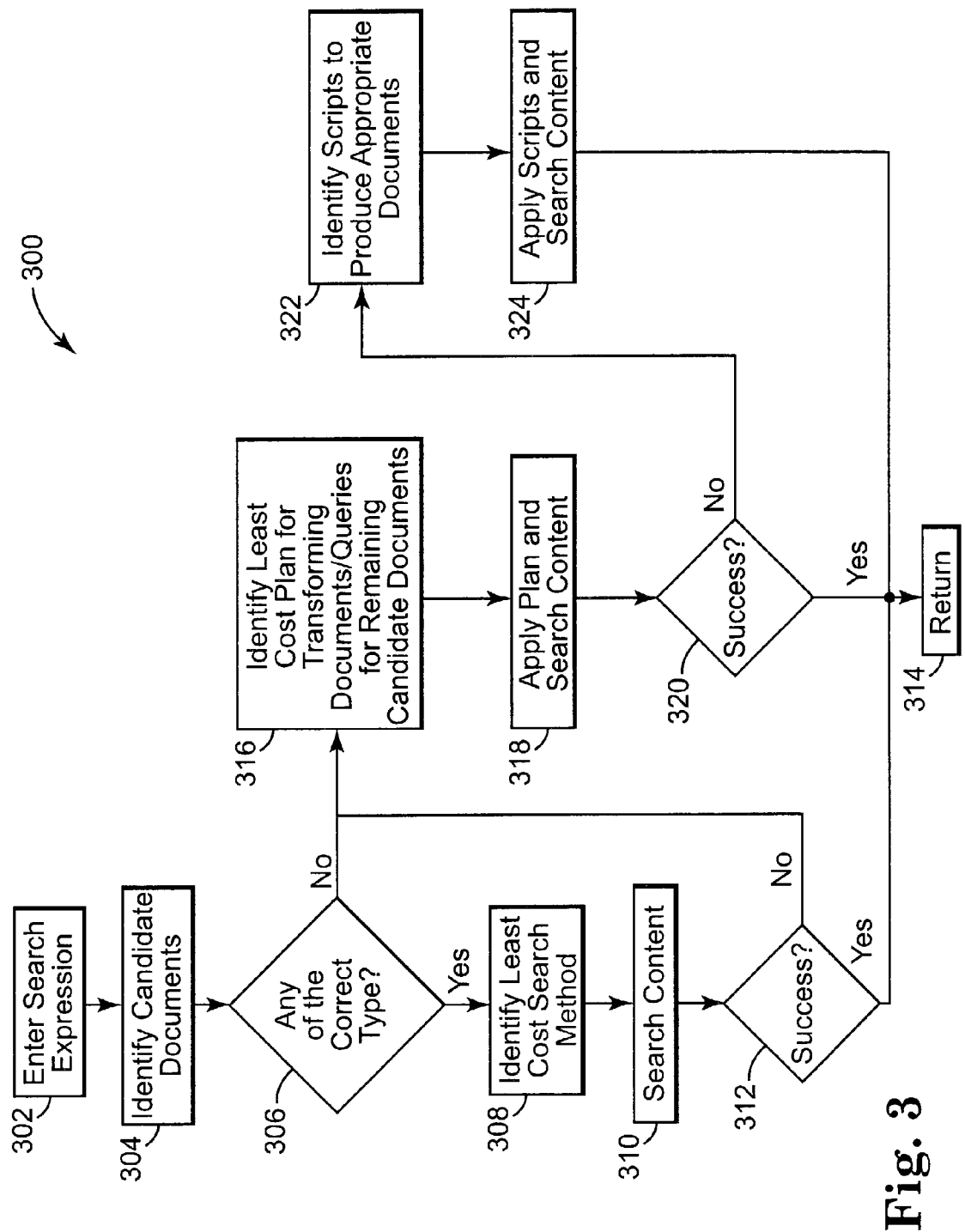
FIG. 3 is a flow diagram of a document retrieval process performed by a document retrieval system according to one embodiment of the present invention.

FIG. 3 is a flow diagram of a document retrieval process 300 performed by document retrieval system 100 according to one embodiment of the present invention. In one embodiment, the retrieval process 300 takes both search and transformation costs into account when creating a transformation plan 109. In the following description, r denotes the desired type (or types) 202 of the result document.

In step 302 of process 300, a search expression 104 is entered into one of requesting devices 104, and sent to document retrieval engine 108. In step 304, retrieval engine 108 identifies a candidate set, D, of documents 206 in document storage 110 that match the metadata criteria 104A of the received search expression 104 in all aspects except that the desired document type, r, need not match. Also, the content-dependent criteria 104B need not match for the documents 206 in the candidate set, D.

In step 306, retrieval engine 108 determines whether any of the documents 206 in the candidate set, D, are of the desired document type, r. If none of the documents 206 in the candidate set, D, are of the correct type, r, then the process jumps to step 316. If one or more of the candidate documents 206 are of the correct type, then in step 308, retrieval engine 108 identifies the least cost search method for each of the correctly typed documents 206.

In an alternative embodiment, steps 308 and 310 are not used, and the process 300 always goes to step 316. For example, it may be more efficient to transform a document and then search the transformed document, than to search the document in its original form.

In step 310, retrieval engine 108 checks the correctly typed documents 206 for content match using the identified least-cost search method for each type. In step 312, retrieval engine 108 determines if the search in step 310 resulted in a content match. If none of the documents 206 searched in step 310 have content 206B that matches the content expression 104B of the received search expression 104, the process jumps to step 316. In one embodiment, if one or more of the documents 206 searched in step 310 have content 206B that matches the content expression 104B of the received search expression 104, the process jumps to step 314, where retrieval engine 108 returns a result 106 to the appropriate requesting device 102 identifying the matching document(s) 206.

If none of the documents 206 in the candidate set, D, are of the correct type, r, or if the search of the correctly typed documents 206 in step 310 did not result in a content match, then retrieval engine 108 performs step 316. In step 316, retrieval engine 108 identifies the least costly transformation plan 109 for transforming documents 206 in the candidate set, D, and/or for transforming the received search expression 104. In one embodiment, retrieval engine 108 searches document storage 110 for transformation documents 204 that can be used to convert documents 206 in the candidate set, D, into documents 206 of the requested type, r. For example, if a search expression 104 requested documents of the type "preferences for midsize cars" but document storage 110 contained only documents of the type "preferences for compact cars" along with a transformation 204 to convert these incorrectly typed documents 206 into "preferences for midsize cars" documents, then retrieval engine 108 would apply this transformation 204.

In step 318, retrieval engine 108 applies the transformation plan 109 identified in step 316, and searches the content 206B of the transformed documents 206 using the content expression 104B of the received search expression 104.

In step 320, retrieval engine 108 determines if the search in step 318 resulted in a content match. If none of the documents 206 searched in step 318 have content 206B that matches the content expression 104B of the received search expression 104, the process jumps to step 322. In one embodiment, if one or more of the documents 206 searched in step 318 have content 206B that matches the content expression 104B of the received search expression 104, the process jumps to step 314, where retrieval engine 108 returns a result 106 to the requesting device 102 identifying the matching document(s) 206. Steps 316–320 of process 300 are described in further detail below with reference to FIGS. 4 and 5.

If steps 316 and 318 did not produce a document 206 that matched the received search expression 104, then in step 322, retrieval engine 108 identifies and retrieves one or more script documents 208 from document storage 110. A script 208 is a special type of transformation document that can be executed by retrieval engine 108 to produce a document of a certain type 202. Scripts 208 define meta-service functions that can independently retrieve and act upon multiple source documents 206. For example, assume that a received search expression 104 requested a "MeetingResponse" type document 206 and that document storage 110 included a "MeetingRequest" type document 206, but not a "MeetingResponse" type document 206. Assume further that document storage 110 does not include any documents 206 of a type 202 that can be transformed into the desired "MeetingResponse" type, or that document storage 110 does not include a transform document 204 to produce the desired transformation. In this example, retrieval engine 108 retrieves a script 208 from document storage 110 and executes the script 208 to produce the desired "MeetingResponse" type document 206. In one embodiment, the "MeetingResponse" type document 206 would be produced based on information in the "MeetingRequest" type document 206, and/or based on other available information.

In step 324, retrieval engine 108 executes the scripts 208 found in step 322 to generate one or more documents 206 of the correct type, r, and searches the content 206B of the generated documents 206 using the content search expression 104B of the received search expression 104. In step 314, retrieval engine 108 returns a result 106 to the appropriate requesting device 102, identifying any matching document(s) 206.

Figure 4:
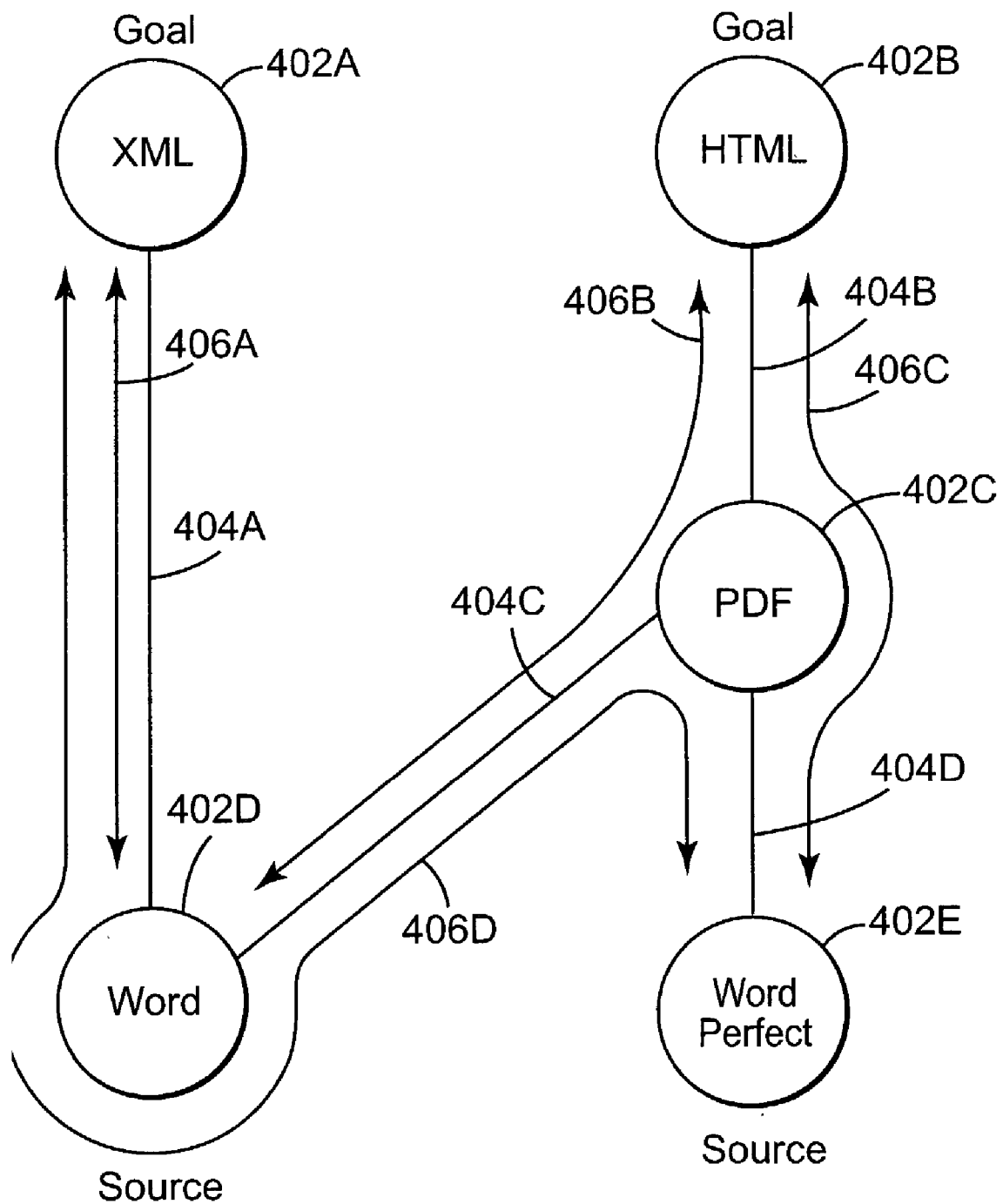
FIG. 4 is a node diagram illustrating a plurality of document types and transformation paths according to one embodiment of the present invention.

Steps 316–320 of process 300 will now be described in further detail with reference to FIGS. 4 and 5. FIG. 4 is a node diagram illustrating a plurality of document types and transformation paths according to one embodiment of the present invention. FIG. 4 illustrates five nodes 402A–402E (collectively referred to as nodes 402), with each node 402 representing a particular document type 202. In the embodiment shown, nodes 402A–402E represent XML, HTML, PDF, Word, and WordPerfect type documents 206, respectively. In another embodiment, nodes 402 might represent various XML document types that can be linked by transformations (e.g., XSLT transformations). Various ones of the nodes 402 are connected together via connection lines 404A–404D (collectively referred to as connection lines 404). Each connection line 404 represents a transformation 204 between document types. For example, connection line 404A represents a transformation between XML type documents and Word type documents.

Nodes 402A and 402B are "goal nodes," which represent the desired document type, r. In the example shown, two desired document types (i.e., XML and HTML) have been specified in a received search expression 104, so there are two goal nodes 402. Nodes 402D and 402E are "source nodes," which represent the types 202 of documents 206 found in candidate set, D, (i.e., the documents 206 identified in step 304 of process 300).

Step 316 of process 300 involves a conventional path-search problem, where retrieval engine 108 attempts to find a path or paths from one or more source nodes (e.g., 402D and 402E) to one or more goal nodes (e.g., 402A and 402B). Four paths 406A–406D (collectively referred to as paths 406) are shown in FIG. 4. Path 406A involves a single transformation 204 (represented by connection line 404A) for transforming source node 402D into a goal node 402A. Path 406B involves two transformations 204 (represented by connection lines 404B and 404C) for transforming source node 402D into a goal node 402B. Path 406C involves two transformations 204 (represented by connection lines 404B and 404D) for transforming source node 402E into a goal node 402B. Path 406D involves three transformations 204 (represented by connection lines 404A, 404C, and 404D) for transforming source node 402E into a goal node 402A. Each connection line 404 is associated with a weight, which represents the cost of the corresponding transformation 204. Paths that use multiple transformations 204 to transform a source node into a goal node (e.g., path 406D) will typically, but not necessarily, have a higher cost than paths that use a single transformation (e.g., path 406A).

Figure 5:
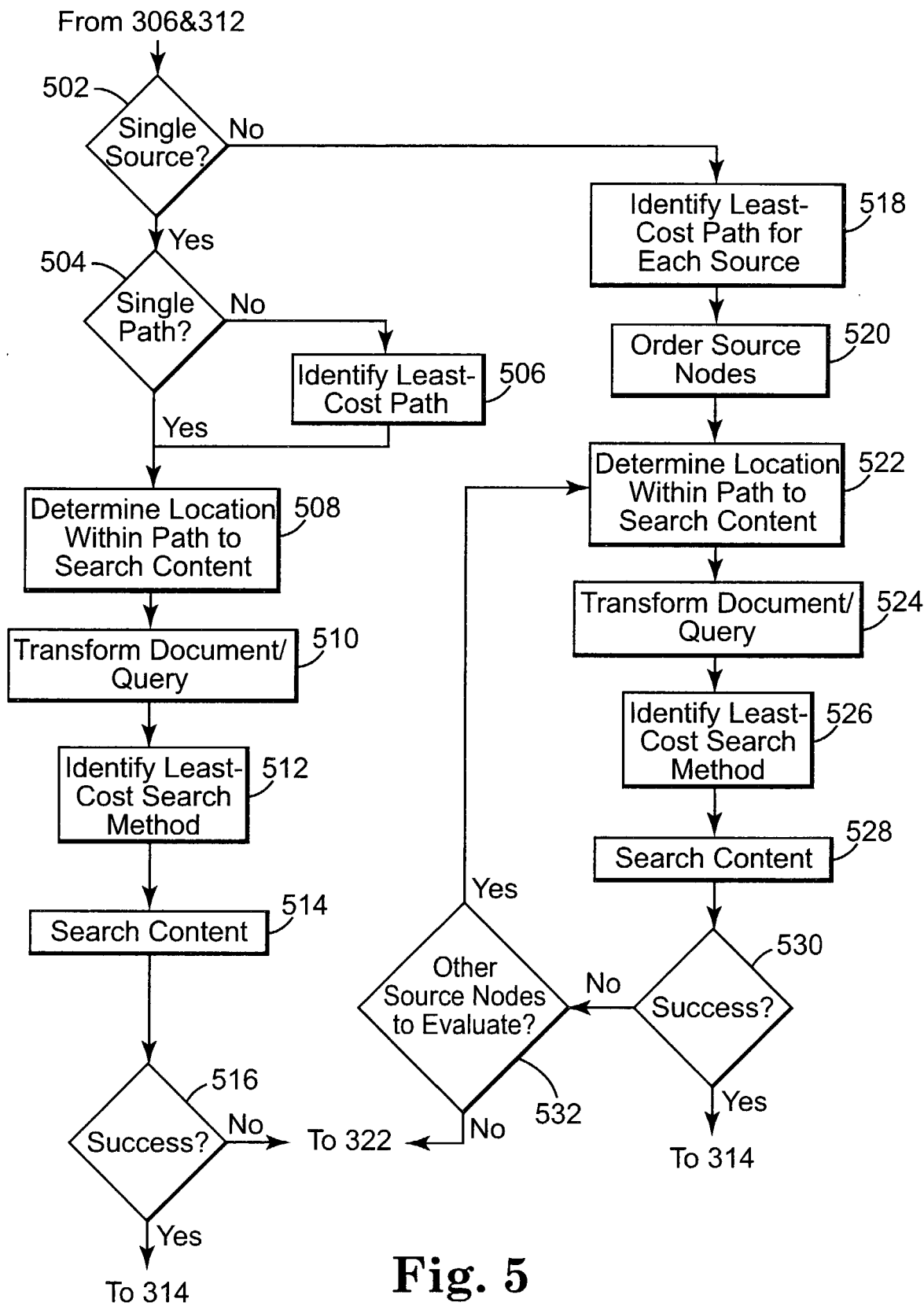
FIG. 5 is a flow diagram illustrating additional detail for some of the steps of the document retrieval process shown in FIG. 3 according to one embodiment of the present invention.

FIG. 5 is a flow diagram illustrating additional detail for steps 316–320 of document retrieval process 300 according to one embodiment of the present invention. Step 502 is performed if either of the decision blocks 306 or 312 in FIG. 3 result in a "no" answer. In step 502, retrieval engine 108 determines if there is only a single source node 402 (i.e., the candidate set, D, of documents 206 identified in step 304 of process 300 include only one type 202 of document 206).

If there is more than one source node 402, the process jumps to step 518 (described below). If there is only a single source node 402, retrieval engine 108 determines in step 504 whether there is a single path 406 from the source node 402 to the goal node 402. It will be assumed for this description that a single goal node 402 is specified (i.e., a received search expression 104 specifies a single desired document type 202). If there are multiple paths 406, in step 506, retrieval engine 108 calculates the cost for each path 406 based on the cost functions 204D of the transforms 204 along the path 406, and identifies the path 406 with the least cost.

In step 508, for the least cost path 406 (or the only path if there is a single path), retrieval engine 108 determines a location (i.e., a node 402) within the path 406 to search the content 206B. Recall that the content search expression 104B is an expression over documents of a particular type 202. The content search can be applied to a document 206 that has been transformed into the desired type, r, (i.e., the search is applied at the goal node). Alternatively, the content search can be applied to any node 402 along the path 406. In effect, this moves the evaluation of the content-based search criteria from the goal node 402, closer to the source nodes 402.

In order to apply a content search at a node other than the goal node, the content expression 104B in the received search expression 104 is transformed from the specified type, r, into an appropriate type for the document to be searched. In one embodiment, in addition to being associated with a weight representing document transformation costs, each connection line 404 in FIG. 4 is also associated with a weight representing the cost of the corresponding search expression transformation. The paths 404 in FIG. 4 are shown as two-way paths, since the transformation 204 will go one way for a document transformation, and will go the opposite way for a search expression transformation. Retrieval engine 108 calculates costs for the various document transformations and search expression transformations for the path, and identifies an optimal node 402 within the path to search the content.

Although two-way paths 404 are shown for each transformation 204 in FIG. 4, it will be understood by persons of ordinary skill in the art that one or more of the paths 204 may not be two-way. For example, even though a transformation 204 exists for converting a document 206 from type A to type B, there may not be an available search expression transformation for converting a search expression 104 of type B into a search expression 104 of type A.

In step 510, retrieval engine 108 executes transformations 204 based on the identification in step 508 of where within the path to apply the content search. If the search is to be performed at the goal node, only document transformations 204 are executed. If the search is to be performed at a node other than the goal node, then the appropriate document transformations and search expression transformations are executed.

After identifying the node 402 within the path to search the content 206B and performing the necessary transformations, in step 512, retrieval engine 108 determines the least cost search method for searching the content. Based on the document type 202 associated with the identified node 402, retrieval engine 108 examines the cost functions (e.g., 202C and 202E) for the various methods of searching this document type 202, and identifies the least cost search method.

In step 514, retrieval engine 108 checks the document 206 for content match using the identified least-cost search method for that type 202.

In step 516, retrieval engine 108 determines if the search in step 514 resulted in a content match. If the document 206 searched in step 514 does not have content 206B that matches the content expression 104B of the received search expression 104, the process jumps to step 322 (shown in FIG. 3). In one embodiment, if the document 206 searched in step 514 has content 206B that matches the content expression 104B of the received search expression 104, the process jumps to step 314 (shown in FIG. 3), where retrieval engine 108 returns a result 106 to the appropriate requesting device 102, identifying the matching document 206.

If there are multiple source nodes 402 (i.e., the candidate set, D, of documents 206 identified in step 304 of process 300 include multiple types 202 of documents 206), as determined in step 502, then the process jumps to step 518. In step 518, retrieval engine 108 calculates the cost for each path 406 for each source node 402 based on the cost functions 204D of the transforms 204 along the path 406, and identifies the least-cost path 406 for each source node 402. In step 520, retrieval engine 108 orders the source nodes 402 by the cost of their least-cost path 406 and puts the ordered source nodes 402 and their least-cost transformation paths 406 in a result set, R. Retrieval engine 108 then evaluates the source nodes 402 in that order.

In step 522, for the first source node 402 in the result set, R, retrieval engine 108 determines the location within the least-cost path 406 for that source node 402 to search the content 206B. Retrieval engine 108 calculates costs for the various document transformations and search expression transformations for the path, and identifies an optimal node 402 within the path to search the content. In step 524, retrieval engine 108 executes transformations 204 based on the identification in step 522 of where within the path to apply the content search. If the search is to be performed at the goal node, only document transformations 204 are executed. If the search is to be performed at a node other than the goal node, then appropriate document transformations and search expression transformations are executed.

After identifying the node 402 within the path to search the content 206B and performing the necessary transformations, in step 526, retrieval engine 108 determines the least cost search method for searching the content. Based on the document type 202 associated with the identified node 402, retrieval engine 108 examines the cost functions (e.g., 202C and 202E) for the various methods of searching this document type 202, and identifies the least cost search method.

In step 528, retrieval engine 108 checks the document 206 for content match using the identified least-cost search method for that type. In one embodiment, retrieval engine 108 uses conventional techniques known to those of ordinary skill in the art for identifying least cost search methods as set forth in steps 512 and 526, and for applying those identified methods.

In step 530, retrieval engine 110 determines if the search in step 528 resulted in a content match. If the document 206 searched in step 528 does not have content 206B that matches the content expression 104B of the received search expression 104, the process jumps to step 532. In step 532, retrieval engine 108 determines if there are any other source nodes 402 remaining in the result set, R, to be evaluated. If there are remaining source nodes 402 to be evaluated, steps 522–530 are repeated for each such source node 402. If it is determined at step 532 that there are no more source nodes 402 remaining in the result set, R, to be evaluated, the process jumps to step 322 (shown in FIG. 3). In one embodiment, if the document 206 searched in step 528 has content 206B that matches the content expression 104B of the received search expression 104, the process jumps to step 314 (shown in FIG. 3), where retrieval engine 108 returns a result 106 to the requesting device 102 identifying the matching document 206.

In one embodiment, document retrieval engine 108 does not return all possible matching documents 206. For example, if an exact match for both metadata 206A and content 206B is found after step 310 of process 300, then retrieval engine 108 does not proceed to find and apply transformations 204 or scripts 208. In an alternative embodiment, retrieval engine 108 is configured to return all possible matches.

It will be understood by a person of ordinary skill in the art that functions performed by retrieval engine 108 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

Embodiments of the present invention provide a superior system for the management of document storage, retrieval, and exchange (i.e., transformation of documents from one type to another). One embodiment of the invention provides a flexible document exchange service that takes both search and transformation costs into account when creating a transformation plan 109.

In one embodiment, the invention decouples document type 202 and metadata 206A from document content 206B, and frees service developers from having to implement storage and retrieval systems manually. By abstracting documents 206 to types 202 and treating transformations 204 and scripts 208 as a means to move from one type 202 to another, responsibility for document exchange management can be delegated to a third-party service. In addition, one embodiment of the system automatically determines the optimal strategy for converting and searching typed documents.

Numerous differences exist between embodiments of the present invention and systems using "database views." A database view is a query that is stored and given a name so that it can be used in other queries. The content of a database view is a transformation of a given database. Optimizing a query upon a view thus leads to the issue of whether to transform the query to operate upon the base data or whether to transform the base data (instantiate the view) and then perform the query upon it.

Differences between one form of the present invention and database views include: (1) One embodiment of the invention addresses the problem of transforming documents and metadata, not views. Transformations 204 may or may not exist for given combinations of document types 202. A multitude of transformations 204 may exist for a given document type 202, and one form of the invention chooses between the various transformations 204; (2) In the database view context, there is presumed to be one correct result for a given query, and the optimization task is to choose the single best plan among many to generate the result. In the context of one form of the invention, there may be multiple correct results for a query, depending on the transformations chosen and the original source documents. In addition, for a single result, there may be multiple plans to generate the result. An optimization task performed by one embodiment of the invention is to choose the single best plan for a single result and, in the case of multiple results for a query, to choose which of the many results to return.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A computer implemented method for responding to search requests for stored documents, the method comprising:
   providing stored documents, each of the stored documents including metadata, content, and a document type identifier for identifying a type of the document;
   receiving a search request including document type criteria, metadata criteria, and content criteria;
   identifying a first set of documents based on the metadata criteria;
   identifying documents in the first set that have a document type identifier that matches the document type criteria;
   automatically identifying a search method from a plurality of search methods for searching the content of the identified documents in the first set based on the document type identifier of the documents;
   searching the content of the identified documents in the first set using the identified search method and the content criteria;
   transforming documents in the first set that are of types that do not match the document type criteria to documents of a type that matches the document type criteria;
   searching the content of the transformed documents based on the content criteria; and
   wherein a search result includes document identifiers for transformed documents that have content that matches the content criteria.

2. The method of claim 1, and further comprising:
   outputting a search result including document identifiers for identified documents in the first set that have content that matches the content criteria.

3. The method of claim 1, wherein each one of the plurality of search methods has an associated cost, and wherein the identified search method has the least associated cost.

4. The method of claim 3, wherein the cast associated with each search method includes estimates of system resources that will be needed to perform a search using that search method.

5. The method of claim 4, wherein the estimates of system resources include estimates of at least one of the following: memory requirements, processing requirements, and input/output requirements.

6. The method of claim 1, and further comprising:
   providing a plurality of transforms, each transform configured to transform documents of one type to documents of a different type;
   associating a cost with each transform; and
   identifying transforms to use to perform the step of transforming documents in the first set based on the costs associated with the transforms.

7. The method of claim 6, wherein the cost associated with each transform includes estimates of system resources that will be needed to execute the transform.

8. The method of claim 1, wherein the content criteria of the search request specifies criteria for searching the content of documents of a first type, the method further comprising:
   transforming the content criteria of the search request such that the transformed content criteria specifies criteria for searching the content of documents of a second type that is different than the first type.

9. The method of claim 1, and further comprising:
   generating documents of a type specified by the document type criteria using at least one document generating script;
   searching the content of the generated documents based on the content criteria; and
   wherein the search result includes document identifiers for generated documents that have content that matches the content criteria.

10. The method of claim 1, wherein a search result includes identifiers to documents distributed among a plurality of platforms.

11. A computer implemented method for responding to search requests for stored documents, the method comprising:
    providing stored documents, each of the stored documents including metadata, content, and a document type identifier for identifying a type of the document;
    receiving a search request including document type criteria, metadata criteria, and content criteria;
    identifying a first set of documents based on the metadata criteria;
    determining whether at least one document in the first set of documents matches the document type criteria;
    searching the content of the at least one document in response to determining that at least one document in the first set of documents matches the document type criteria, wherein the searching of the content is performed based on the content criteria;
    transforming documents in the first set that have content that matches the content criteria to documents of a type that matches the document type criteria in response to determining tat no documents in the first set of documents match the document type criteria;
    searching the content of the transformed documents based on the content criteria; and
    outputting a search result including document identifiers for searched documents that have content that matches the content criteria.

12. The method of claim 11, and further comprising:
    providing a first plurality of type specific search methods, each search method configured for searching the content of documents of one type;
    identifying a search method from the first plurality of search methods based on the type of a document to be searched; and
    wherein the step of searching the content of documents in the first set is performed using the identified search method.

13. The method of claim 12, wherein each search method in the first plurality has an associated cost, and wherein the identification of a search method is performed based on the cost of the search methods.

14. The method of claim 13, wherein the cost associated with each search method includes estimates of system resources that will be needed to perform a search using that search method.

15. The method of claim 11, and further comprising:
providing a plurality of transforms, each transform configured to transform documents of one type into documents of a different type;
associating a cost with each transform; and
identifying transforms to use to perform the step of transforming documents in the first set based on the costs associated with the transforms.

16. The method of claim 15, wherein the cost associated with each transform includes estimates of system resources that will be needed to execute the transform.

17. The method of claim 11, wherein the content criteria of the search request specifies criteria for searching the content of documents of a first type, the method further comprising:
transforming the content criteria of the search request such that the transformed content criteria specifies criteria for searching the content of documents of a second type that is different than the first type.

18. The method of claim 11, and further comprising:
generating documents of a type specified by the document type criteria;
searching the content of the generated documents based on the content criteria; and
wherein the search result includes document identifiers for generated documents that have content that matches the content criteria.

19. The method of claim 11, wherein the search result includes identifiers to documents distributed among a plurality of platforms.

20. A computer apparatus for responding to search requests for stored documents, the apparatus comprising:
means for providing stored documents, each of the stored documents including content and a document type identifier for identifying a type of the document;
means for receiving a search request including document type criteria and content criteria;
means for identifying documents that have a document type identifier that matched the document type criteria;
means for transforming documents of a first type not specified by the document type criteria to documents of a second type specified by the document type criteria;
means for generating documents of a type specified by the document type criteria; means for searching the content of the identified documents, transformed documents, and generated documents based on the content criteria; and
means for outputting a search result including document identifiers for searched documents that have content that matches the content criteria.

21. The apparatus of claim 20, and further comprising:
means for performing a first plurality of type specific search methods, each search method configured for searching the content of documents of one document type;
means for identifying a type specific search method from the first plurality of search methods based on the type of a document to be searched; and
wherein the means for searching the content is configured to search the content using the identified type specific search method.

22. The apparatus of claim 21, wherein each search method in the first plurality has an associated cost, and wherein the means for identifying a search method is configured to identify a search method based on the cost of the search methods.

23. The apparatus of claim 22, wherein the cost associated with each search method includes estimates of system resources that will be needed to perform a search using that search method.

24. The apparatus of claim 20, and further comprising:
a plurality of transforms, each transform configured to transform documents of one type into documents of a different type, each transform associated with a cost; and
means for identifying transforms to be used by the means for transforming documents based on the costs associated with the transforms.

25. The apparatus of claim 24, wherein the cost associated with each transform includes estimates of system resources that will be needed to execute the transform.

26. The apparatus of claim 20, wherein the content criteria of the search request specifies criteria for searching the content of documents of a first type, the apparatus further comprising:
means for transforming the content criteria of the search request such that the transformed content criteria specifies criteria for searching the content of documents of a second type that is different than the first type.

27. The apparatus of claim 20, wherein the search result includes identifiers to documents distributed among a plurality of platforms.

28. A query processing computer apparatus, comprising:
a receiver for receiving a query including document type criteria and content criteria for a document instance including metadata and content; and
a search engine for identifying documents that are of a type that matches the document type criteria, transforming documents of a first type not specified by the document type criteria to documents of a second type specified by the document type criteria, generating documents of a type specified by the document type criteria, and searching content of the identified documents, transformed documents, and generated documents based on the content criteria, the search engine configured to output a search result including document identifiers for searched documents that have content that matches the content criteria.

29. The query processing apparatus of claim 28, wherein the search engine is configured to identify search methods for searching the content of documents based on a type of the documents and on costs associated with the search methods.

30. The query processing apparatus of claim 28, wherein the search engine is configured to identify transforms for transforming documents based on costs associated with the transforms.

31. A computer-readable medium having computer-executable instructions for performing a method of processing received queries, the method comprising:
providing stored documents, each of the stored documents including content and a document type identifier for identifying a type of the document;
receiving a query including a document type criteria and document content criteria;

identifying documents that are of a type that matches the document type criteria;

transforming documents of a first type not specified by the document type criteria to documents of a second type specified by the document type criteria;

generating documents of a type specified by the document type criteria;

searching content of the identified documents, transformed documents; and generated documents based on the document content criteria; and identifying documents that have content that matches the content criteria.

32. The computer-readable medium of claim 31, wherein the method further comprises:

identifying search methods for searching the content of documents based on a type of the documents and on costs associated with the search methods.

33. The computer-readable medium of claim 31, wherein the method further comprises:

identifying transforms for transforming documents based on costs associated with the transforms.

34. A computer implemented method for responding to search requests for stored documents, the method comprising:

providing stored documents, each of the stored documents including metadata, content, and a document type identifier for identifying a type of the document;

receiving a search request including document type criteria, metadata criteria, and content criteria;

identifying a first set of documents based on the metadata criteria;

identifying a first subset of documents in the first set of documents that have a document type identifier that matches the document type criteria;

identifying a search method from a plurality of search methods for searching the content of the first subset of documents based on the document type identifier of the documents;

searching the content of the first subset of documents using the identified search method and the content criteria;

identifying a second subset of documents in the first set of documents that do not have a document type identifier that matches the document type criteria;

transforming the second subset of documents to documents of a type that matches the document type criteria;

searching the content of the transformed second subset of documents based on the content criteria; and providing search results including document identifiers for the first subset of documents that have content that matches the content criteria and document identifiers for the transformed second subset of documents that have content that matches the content criteria.

* * * * *

UNITED STATES PATENT AND TRADEMARK OFFICE
CERTIFICATE OF CORRECTION

PATENT NO.         : 7,054,859 B2                                           Page 1 of 1
APPLICATION NO.    : 10/171001
DATED              : May 30, 2006
INVENTOR(S)        : Harumi A. Kuno et al.

It is certified that error appears in the above-identified patent and that said Letters Patent is hereby corrected as shown below:

In column 9, line 59, delete "110" and insert -- 108 --, therefor.

In column 11, line 60, in Claim 4, delete "cast" and insert -- cost --, therefor.

In column 12, line 51, in Claim 11, delete "tat" and insert -- that --, therefor.

In column 13, line 48, in Claim 20, delete "matched" and insert -- matches --, therefor.

In column 15, line 9, in Claim 31, delete "documents;" and insert -- documents, --, therefor.

Signed and Sealed this

Twenty-first Day of July, 2009

JOHN DOLL
*Acting Director of the United States Patent and Trademark Office*